United States Patent
Zhang et al.

(10) Patent No.: US 10,075,056 B2
(45) Date of Patent: Sep. 11, 2018

(54) MODULAR EMBEDDED MULTI-LEVEL CONVERTER

(71) Applicant: GENERAL ELECTRIC COMPANY, Schenectady, NY (US)

(72) Inventors: Di Zhang, Niskayuna, NY (US); Luis Jose Garces, Nlskayuna, NY (US); Andrew Allen Rockhill, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/125,325

(22) PCT Filed: Mar. 19, 2014

(86) PCT No.: PCT/US2014/031178
§ 371 (c)(1),
(2) Date: Sep. 12, 2016

(87) PCT Pub. No.: WO2015/142324
PCT Pub. Date: Sep. 24, 2015

(65) Prior Publication Data
US 2017/0214310 A1    Jul. 27, 2017

(51) Int. Cl.
*H02M 7/21* (2006.01)
*H02M 1/08* (2006.01)
(Continued)

(52) U.S. Cl.
CPC ......... *H02M 1/083* (2013.01); *H02M 7/1557* (2013.01); *H02M 7/217* (2013.01); *H02M 7/525* (2013.01); *H02M 7/539* (2013.01)

(58) Field of Classification Search
CPC .... H02M 1/083; H02M 7/1557; H02M 7/162; H02M 7/1626; H02M 7/217;
(Continued)

(56) References Cited

U.S. PATENT DOCUMENTS 4,482,946 A    11/1984    Bhagwat
4,674,023 A     6/1987    Peppel
(Continued)

FOREIGN PATENT DOCUMENTS

CN    1055629 A    10/1991
CN    103176117 A    6/2013
(Continued)

OTHER PUBLICATIONS

International Search Report and Written opinion issued in connection with corresponding PCT application PCT/US2014/031178 dated Nov. 21, 2014.
(Continued)

*Primary Examiner* — Matthew Nguyen
(74) *Attorney, Agent, or Firm* — GE Global Patent Operations; Scott R. Stanley

(57) ABSTRACT

A method for power conversion includes coupling a first string to a second string via a first connecting node and a second connecting node to form at least one leg of a power converter. The first string is operatively coupled across a first bus and a second bus and comprises a first branch and a second branch coupled via a third connecting node. The first branch and the second branch include a plurality of controllable semiconductor switches. Furthermore, the second string comprises a first chain link and a second chain link coupled via an alternating current phase bus and includes a plurality of switching units. The first chain link and/or the second chain link are controlled to generate a negative voltage across at least one of the plurality of controllable semiconductor switches during a switch turn off process.

19 Claims, 8 Drawing Sheets

(51) Int. Cl.
*H02M 7/155* (2006.01)
*H02M 7/217* (2006.01)
*H02M 7/525* (2006.01)
*H02M 7/539* (2006.01)

(58) Field of Classification Search
CPC ...... H02M 7/219; H02M 7/505; H02M 7/525; H02M 7/5387; H02M 7/539
See application file for complete search history.

(56) References Cited

U.S. PATENT DOCUMENTS

| | | | |
|---|---|---|---|
| 6,426,666 | B1 | 7/2002 | Li et al. |
| 7,196,919 | B2* | 3/2007 | Fu .................. H02M 7/219 363/37 |
| 8,503,202 | B2 | 8/2013 | Chimento et al. |
| 9,252,681 | B2 | 2/2016 | Zhang et al. |
| 9,559,611 | B2 | 1/2017 | Zhang et al. |
| 2013/0279211 | A1 | 10/2013 | Green et al. |
| 2016/0020705 | A1* | 1/2016 | Dong ................ H02M 7/217 363/69 |
| 2016/0141949 | A1* | 5/2016 | Zhang ............... H02M 7/487 363/78 |

FOREIGN PATENT DOCUMENTS

| | | |
|---|---|---|
| CN | 103715931 A | 4/2014 |
| CN | 104426335 A | 3/2015 |
| EP | 2323249 A1 | 5/2011 |
| WO | 02067003 A1 | 8/2002 |
| WO | 2008044374 A1 | 4/2008 |
| WO | 2011124258 A1 | 10/2011 |
| WO | 2014108258 A2 | 7/2014 |

OTHER PUBLICATIONS

"Power Control with Thyristors and Triacs". Power Semiconductor Applications Philips Semiconductors, 84 pages, 1994.
Schettler et al., "HVDC Transmission Systems using Voltage Sourced Converters Design and Applications", Power Engineering Society Summer Meeting, IEEE, pp. 715-720, Jul. 16-20, 2000.
Adam et al., "New flying capacitor multilevel converter", Industrial Electronics (ISIE), IEEE International Symposium on Jun. 27-30, 2011.
Trainer et al., "A new hybrid voltage-sourced converter for HVDC power transmission", Water and Energy International, vol. No. 57b, Issue No. 02, 12 pages, 2014.
Huang et al., "Application of High Power Thyristors in HVDC and FACTS Systems", Siemens AG, pp. 1-8, Jul. 8, 2015.
PCT Preliminary Report on Patentability issued in connection with corresponding PCT Application No. (PCT/US2014/031178 dated Jun. 3, 2016.
European Search Report and Opinion issued in connection with corresponding EP Application No. 14720856.5 dated Jan. 5, 2018.
Machine translation of Chinese Office Action issued in connection with Corresponding CN Application No. 201480077300.8 dated Jan. 29, 2018.

* cited by examiner

MODULAR EMBEDDED MULTI-LEVEL CONVERTER

BACKGROUND

Embodiments of the present invention relate to power converters and more specifically to a multilevel converter.

In the last few decades, the field of power conversion has grown tremendously due to its imminent advantages in motor drives, renewable energy systems, high voltage direct current (HVDC) systems, and the like. A power converter which converts electrical energy from one form (e.g., alternating current (AC) or direct current (DC)) to another form (e.g., DC or AC) utilizes various power electronic devices. Examples of power electronic devices are insulated gate bipolar transistors (IGBTs) and thyristors.

Thyristors have very low conduction losses compared with other power electronic devices such as IGBT. In addition, thyristors can guarantee to fail short, so for the applications which need to connect power electronic devices in series to block high voltage, a system can continue operating even if one or more thyristors fail. This feature of thyristors enables a true redundant design, leading to much higher system reliability. These two features make the thyristor an ideal device for the HVDC application which requires high voltage, high efficiency and high reliability. However, thyristors are only partially controllable devices and thus cannot be turned off as fully controllable devices such as IGBT. Therefore, thyristors are generally used in a load commutated converter (LCC) based classic HVDC systems, in which thyristors are turned off with the help of an AC grid.

Due to the switching limitations of thyristors, IGBTs are usually considered as the main workhorse for a voltage source converter (VSC) based HVDC system. The VSC based HVDC system compared with the LCC based classic HVDC has many potential benefits: 1) can support passive network, or act as the grid for an island; 2) can control reactive power independent from active power. However, IGBTs lack the above mentioned features of thyristors.

Therefore, there still exists a need for an economically more viable as well as technically reliable and efficient alternative solutions for voltage source converters.

BRIEF DESCRIPTION

In accordance with an embodiment of the present technique, a method for power conversion is provided. The method includes coupling a first string to a second string via a first connecting node and a second connecting node to form at least one leg of a power converter. The first string is operatively coupled across a first bus and a second bus and includes a first branch and a second branch coupled via a third connecting node. Furthermore, the first branch and the second branch include a plurality of controllable semiconductor switches and the second string includes a first chain link and a second chain link coupled via an alternating current phase bus and includes a plurality of switching units. The method also includes controlling the first chain link and/or the second chain link to generate a negative voltage across at least one of the plurality of controllable semiconductor switches during a switch turn off process.

In accordance with another embodiment of the present technique, a power converter including one or more phase legs is provided. Each of the one or more phase legs includes a first string including a first branch and a second branch including a plurality of controllable semiconductor switches, a first connecting node, and a second connecting node, wherein the first string is operatively coupled across a first bus and a second bus and the second branch is operatively coupled to the first branch via a third connecting node. Each of the one or more phase legs also include a second string operatively coupled to the first string via the first connecting node and the second connecting node, wherein the second string includes a first chain link and a second chain link including a plurality of switching units, and wherein the second chain link is operatively coupled to the first chain link via an alternating current phase bus. The power converter further includes a controller configured to control a switch turn-off process of at least one of the plurality of controllable semiconductor switches by regulating the first chain link and the second chain link; wherein the first chain link and/or the second chain link are utilized to generate a negative voltage across the at least one controllable semiconductor switch during the switch turn off process.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or passive and are connected or otherwise coupled together to provide the described function.

As will be described in detail hereinafter, various embodiments of an exemplary system for power conversion and method for power conversion are presented. By employing the power converter and the method for power conversion described hereinafter, a multilevel converter is provided. In one example, the power converter may include a modular multilevel embedded converter. The term multilevel converter, as used herein, is used to refer to a converter that converts one form of input voltage/current to another form of output voltage/current with very low distortion.

Figure 1:
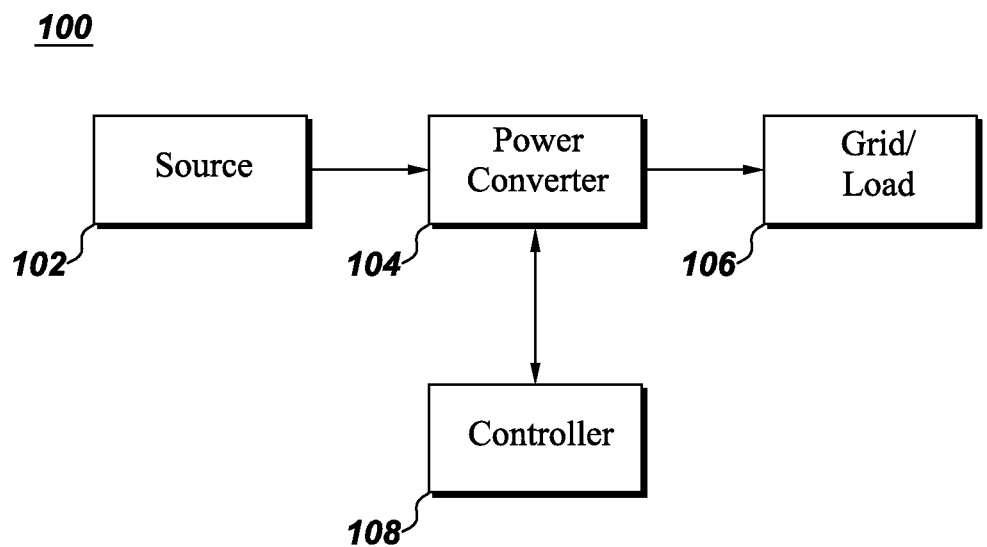
FIG. 1 is a diagrammatical representation of a system for power conversion.

Turning now to the drawings, by way of example in FIG. 1, a system 100 for converting power is depicted. In one embodiment, the system 100 for converting power may include a source 102, a power converter 104, and a grid/utility/load 106. The term source, as used herein, is used to refer to a renewable power source, a non-renewable power source, a generator, a grid, and the like. Also, the term load, as used herein, may be used to refer to a grid, an electrical appliance, and the like. In addition, the power converter 104 may be a multilevel converter. In one embodiment, the source 102 may be operatively coupled to a first terminal (not shown) of the power converter 104. A second terminal (not shown) of the power converter 104 may be operatively coupled to the load 106. The first terminal and the second terminal may be alternatively employed as an input terminal or an output terminal of the power converter 104.

Also, the system 100 may include a controller 108. The controller 108 may be configured to control the operation of the power converter 104, in one embodiment. By way of example, the controller 108 may be configured to control the operation of the power converter 104 by controlling switching of a plurality of semiconductor switches of the power converter 104. Furthermore, in one embodiment, the system 100 may also include other circuit components (not shown) such as, but not limited to, a circuit breaker, an inductor, a compensator, a capacitor, a rectifier, a reactor, a filter, and the like.

Figure 2:
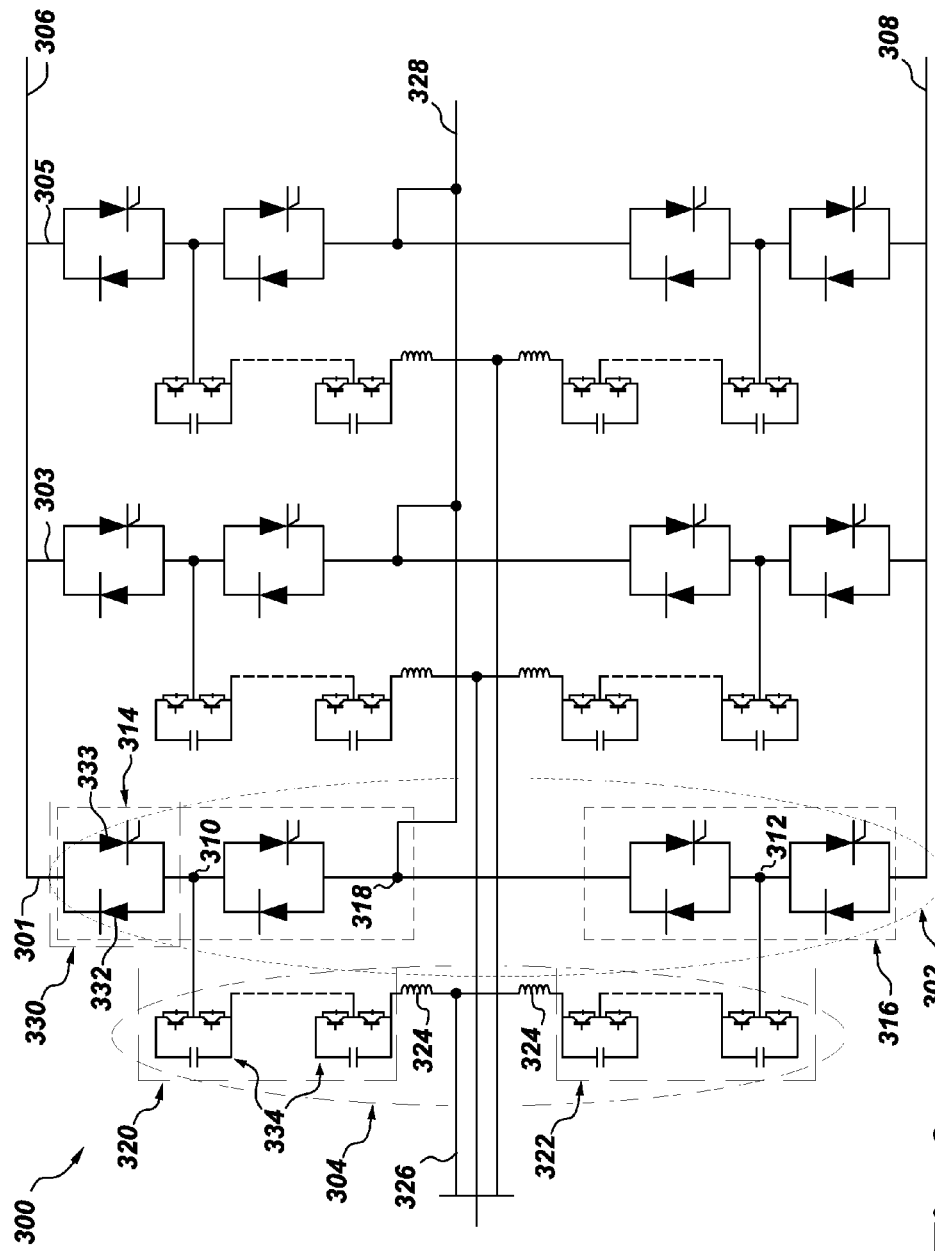
FIG. 2 is a diagrammatical representation of an exemplary embodiment of a modular embedded multilevel converter (MEMC) for use in the system of FIG. 1, according to aspects of the present disclosure.

Referring now to FIG. 2, a diagrammatical representation of an exemplary embodiment of a modular embedded multilevel converter (MEMC) 300 for use in the system of FIG. 1 according to aspects of the present disclosure is depicted. In one embodiment, MEMC 300 includes three legs 301, 303 and 305 respectively. The three legs 301, 303 and 305 are for three different phases and thus can also be called as phase legs. Furthermore, each phase leg 301, 303 and 305 of the MEMC may include a first string 302 and a second string 304. It should be noted that even though in FIG. 2, certain referral numerals are shown for only one leg 301, they can be equally applicable to other two phase legs 303 and 305. More particularly, the first string 302 may be operatively coupled to the second string 304 to form the leg 301. Furthermore, the first string 302 may be operatively coupled between a first bus 306 and a second bus 308. In one embodiment, the first bus 306 may include a positive DC bus and the second bus 308 may include a negative DC bus. The second string 304 may be operatively coupled to the first string 302 via a first connecting node 310 and a second connecting node 312. Also, the first string 302 may include a first branch 314 operatively coupled to a second branch 316 via a third connecting node 318. Similarly, the second string 304 may include a first chain link 320 operatively coupled to a second chain link 322 via at least one AC phase 326 and an inductor 324. The term "chain link" here refers to a series string of switching modules such as elements 334. In an embodiment, inductor 324 is a split inductor i.e., inductor 324 is split into two parts. The third connecting node 318 may be operatively coupled to a third bus 328.

In addition, the first phase leg 301 may be operatively coupled to the second phase leg 303 via the third connecting node 318. Furthermore, in one example, the third connecting nodes 318 of each of the three first strings 302 may be operatively coupled to each other. The third bus 328 is a middle bus which may be floating or grounded or a high impedance grounded bus. However, in another embodiment, for applications such as machine drives, the third connecting nodes 318 of each of the three first strings 302 may be operatively coupled to a neutral bus. Moreover, the three legs 301, 303, 305 may be operatively coupled between the first bus 306 and the second bus 308.

In one embodiment, the third bus 328 may be at a negative potential with respect to the first bus 306 and at a positive potential with respect to the second bus 308. Also, the first string 302 may include a plurality of controllable semiconductor switches 330. In the example of FIG. 2, the plurality of controllable semiconductor switches may include partially controllable semiconductor switches. However, in another embodiment, the plurality of controllable semiconductor switches may include fully controllable semiconductor switches. Moreover, the plurality of controllable semiconductor switches may include a combination of partially controllable semiconductor switches and fully controllable semiconductor switches. By way of a non-limiting example, the first string 302 may include partially controllable semiconductor switches, fully controllable semiconductor switches, or a combination of partially controllable semiconductor switches and fully controllable semiconductor switches. Furthermore, in one example, the first branch 314 of the first string 302 may include two controllable semiconductor switches 330. Similarly, the second branch 316 of the first string 302 may include two controllable semiconductor switches 330. The controllable semiconductor switch 330 may include a power diode 332 in combination with a thyristor 333 or a silicon controlled rectifier. In other embodiments, controllable semiconductor switch 330 may include a thyristor, an anti-parallel thyristor and the like. In one embodiment, controllable semiconductor switch 330 may include one or more thyristors connected in series to develop a proper voltage rating. It should be noted that for ease of explanation, embodiments in subsequent paragraphs are described with respect to thyristors, however, the technique presented herein is equally applicable to other controllable semiconductor switches as discussed above.

The inductors 324 in each leg 301, 303 and 305 are operatively coupled to at least one alternating current (AC) phase (e.g., A, B, and C). In addition, the first chain link 320 and the second chain link 322 of the second string 304 may include a plurality of switching units 334 connected in series to each other. The switching unit 334 may be a combination of a plurality of fully controllable semiconductor switches and an energy storage device. The fully controllable semiconductor switches may include an insulated gate bipolar transistor (IGBT), a metal oxide semiconductor field effect transistor (MOSFET), a field effect transistor (FET), a gate turn-off thyristor, an insulated gate commutated thyristor (IGCT), an injection enhanced gate transistor (IEGT), a silicon carbide based switch, a gallium nitride based switch, a gallium arsenide based switch, or equivalents thereof.

Figure 3:
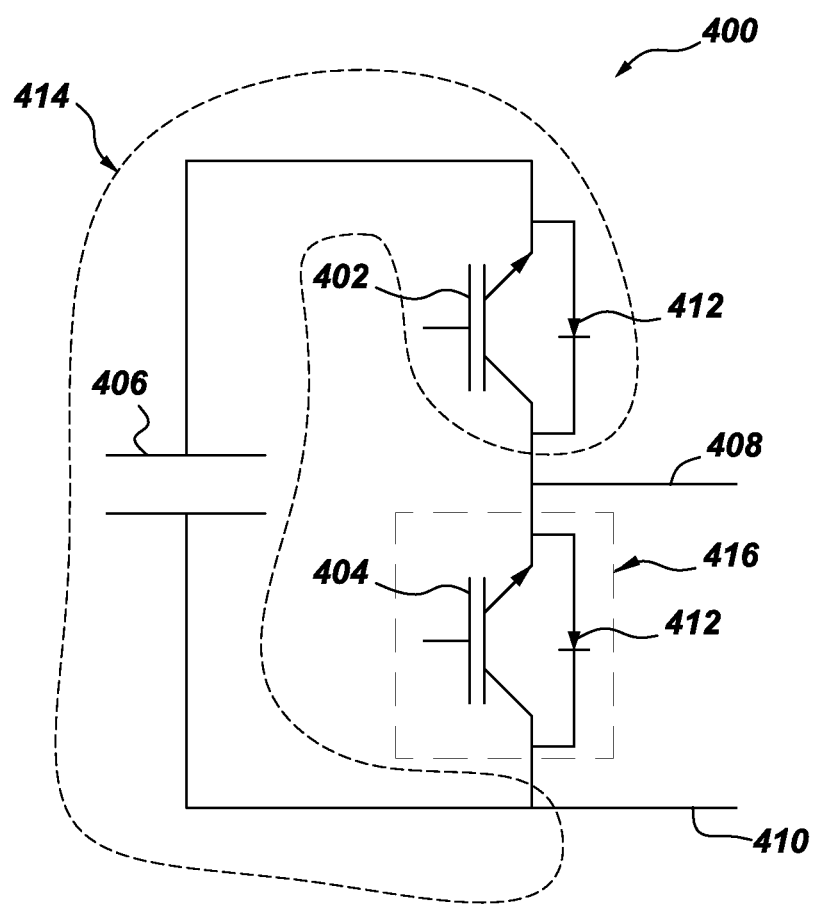
FIG. 3 is a diagrammatical representation of an exemplary embodiment of a switching unit for use in the portion of the power converter of FIG. 2, according to aspects of the present disclosure.

Referring now to FIG. 3, diagrammatical representation 400 of an exemplary embodiment of a switching unit such as the switching unit 334 of FIG. 2 is depicted. In the presently contemplated configuration, the switching unit 400 may be referred to as a half bridge converter and includes fully controllable semiconductor switches 402 and 404, an energy storage device 406, a first connector 408, and a second connector 410. As previously noted, the fully controllable semiconductor switches 402, 404 may include an IGBT, a MOSFET, a FET, an IEGT, a gate turn-off thyristor, an IGCT, a silicon carbide based switch, a gallium nitride based switch, a gallium arsenide based switch, or equivalents thereof. Moreover, each of the fully controllable semiconductor switches 402, 404, may also include a power diode 412 that may be inbuilt and antiparallel to the fully controllable semiconductor switches 402 and 404. The inbuilt power diodes 412 may provide a freewheeling path. These power diodes 412 may also be referred to as freewheeling diodes.

Also, in one non-limiting example, the energy storage device 406 may include a capacitor. In the example of FIG. 3, the fully controllable semiconductor switch 402 may be operatively coupled in series to the energy storage device 406 to form a first limb 414. Also, the other fully controllable semiconductor switch 404 forms a second limb 416. The second limb 416 may be operatively coupled in parallel to the first limb 414. Additionally, the first limb 414 and the second limb 416 may be operatively coupled between the first connector 408 and the second connector 410. Although the example of FIG. 3 depicts the switching units 400 in a half bridge converter configuration as including two fully controllable semiconductor switches, and one energy storage device, use of other numbers of fully controllable semiconductor switches 402, 404, and energy storage devices 406 is also contemplated. In one embodiment, some or all of the switching units may be arranged to form a full bridge converter configuration as will be described in FIG. 4.

Furthermore, in one non-limiting example, when the fully controllable semiconductor switch 402 is activated and the fully controllable semiconductor switch 404 is deactivated, the energy storage device 406 may appear across the first connector 408 and the second connector 410. Consequently, the charge across the energy storage device 406 appears as a voltage across the first connector 408 and the second connector 410. Alternatively, when the fully controllable semiconductor switch 404 is activated and the fully controllable semiconductor switch 402 is deactivated, the first limb 414 is bypassed, thereby providing zero voltage across the first connector 408 and the second connector 410. Hence, by controlling the switching of the fully controllable semiconductor switches 402 and 404 in the plurality of switching units 334 on the second string 304 of FIG. 2, the voltage developed across the second string 304 may be regulated.

Figure 4:
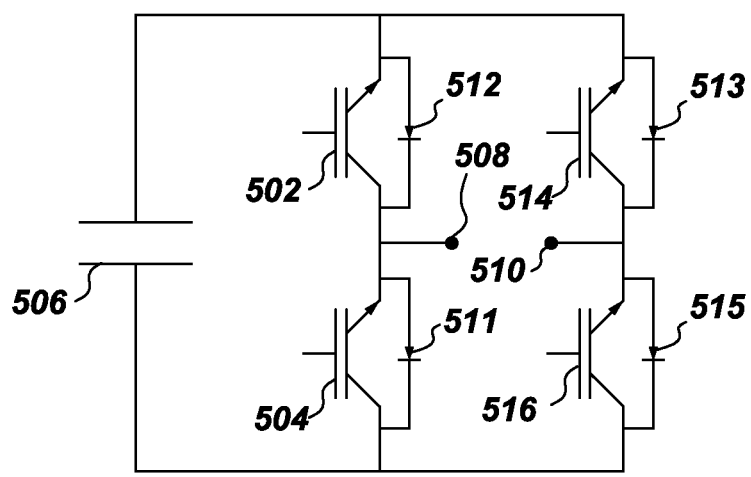
FIG. 4 is a diagrammatical representation of another embodiment of a switching unit for use in the portion of the power converter of FIG. 2, according to aspects of the present disclosure.

Referring now to FIG. 4, diagrammatical representation 500 of an alternative embodiment of switching unit 334 of FIG. 2 is depicted. In the presently contemplated configuration, the switching unit 400 may be referred to as a full bridge converter and may include fully controllable semiconductor switches 502, 504, 514 and 516, an energy storage device 506, a first connector 508, and a second connector 510. As previously noted, the fully controllable semiconductor switches 502, 504, 514 and 516 may include an IGBT, a MOSFET, a FET, an IEGT, a gate turn-off thyristor, an IGCT, a silicon carbide based switch, a gallium nitride based switch, a gallium arsenide based switch, or equivalents thereof. Moreover, each of the fully controllable semiconductor switches 502, 504, 514, 516, may also include a power diode 512, 511, 513 or 515 respectively that may be inbuilt and antiparallel to the fully controllable semiconductor switches. As can be seen, compared to switching unit 400 of FIG. 3, switching unit 500 includes two additional fully controllable semiconductor switches and an output of switching unit 500 appears across first connector 508 and second connector 510. In one embodiment, fully controllable semiconductor switches 502, 504, 514, 516 are controlled to regulate a voltage across first connector 508 and second connector 510. Contrary to switching unit 400, switching unit 500 can produce 3 voltage levels across first connector 508 and second connector 510. The three voltages levels would be a zero voltage level and positive and negative polarity voltage levels, wherein the positive and the negative polarity voltage levels represent a charge across energy storage device 506.

Figure 5:
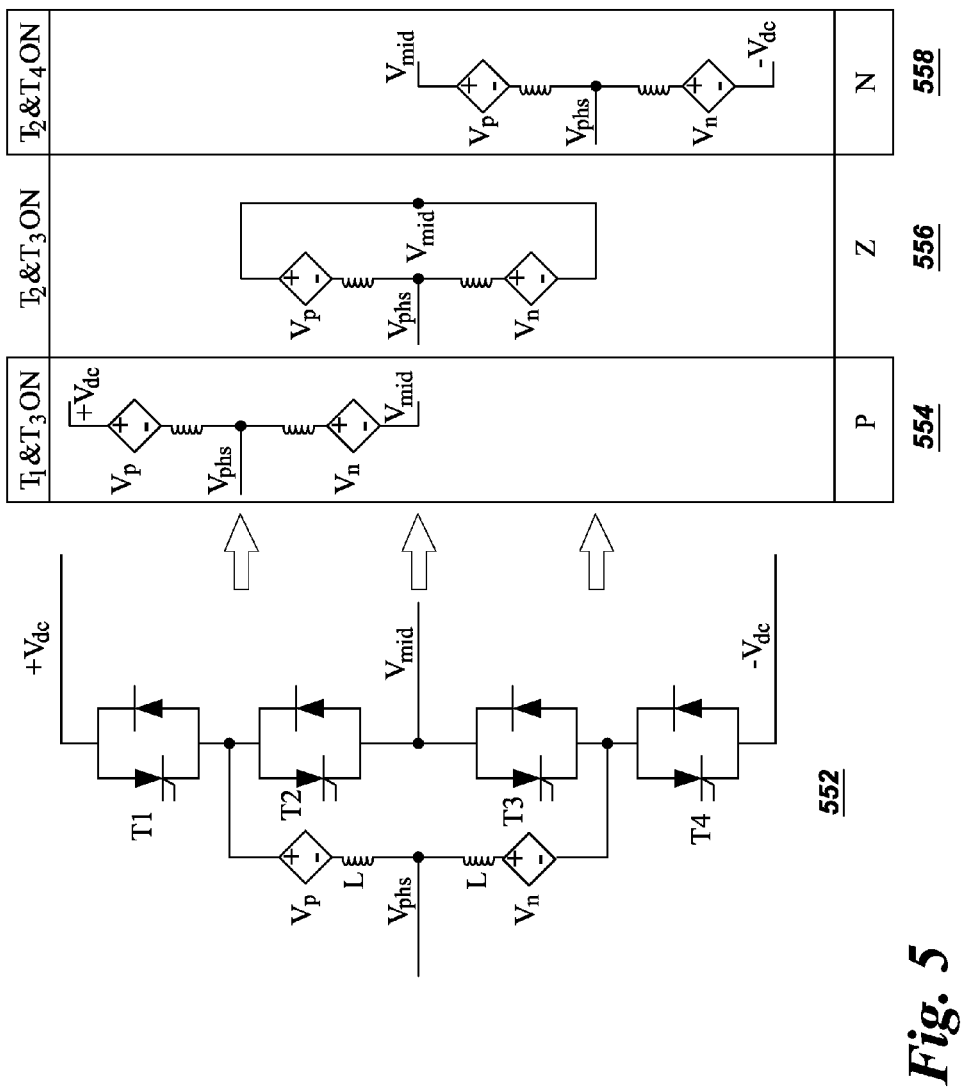
FIG. 5 is a diagrammatical representation of a phase leg and operating states of the phase leg, according to aspects of the present disclosure.

Referring to FIG. 5, a diagrammatical representation 550 of a phase leg 552, such as the leg 301 of FIG. 2, and operating states of phase leg 552 is depicted. For ease of understanding, FIG. 5 will be described with respect to FIG. 2. In general, during operation of MEMC 300 (FIG. 2), there may be at least three operating states positive, negative and zero for each phase leg 301, 303 and 305. In FIG. 5, a first chain link, such as the first chain link 320 of FIG. 2 and a second chain link, such as the second chain link 322 of FIG. 2 is represented by voltage sources $V_p$ and $V_n$, respectively. As noted hereinabove, the first and the second chain links include a plurality of switching units (not shown), however, for ease of explanations the first and the second chain links have been replaced by voltage sources $V_p$ and $V_n$. In other words, the voltage of voltage sources $V_p$ and $V_n$ depend on the switching of the fully controllable semiconductor switches corresponding to the plurality of switching units 334 in chain links 320 and 322 of FIG. 2. Also, in the presently contemplated configuration a first string, such as the first string 302 of FIG. 2 includes four controllable semiconductor switches represented as $T_1$, $T_2$, $T_3$ and $T_4$.

FIG. 5 also depicts operating states such as a positive state 554, a negative state 558 and a zero state 556 of phase leg 552. As can be seen, the positive state 554 includes switching on first and third thyristors $T_1$ $T_3$ and switching off second and fourth thyristors $T_2$, $T_4$. Furthermore, the negative state 558 includes switching on second and fourth thyristors $T_2$, $T_4$ and switching off first and third thyristors $T_1$, $T_3$ and the zero state 556 includes switching on second and third thyristors $T_2$, $T_3$ and switching off first and fourth thyristors $T_1$, $T_4$. Depending on the state, voltage sources $V_p$ and $V_n$ are connected between at least one AC phase (represented by voltage $V_{phs}$) and one of the three buses, a positive DC bus (represented by voltage $+V_{dc}$), a negative DC bus (represented by voltage $-V_{dc}$) or a middle bus (represented by voltage $V_{mid}$) via inductor L. For example, in the positive state 554, voltage source $V_p$ is connected between AC phase voltage $V_{phs}$ and positive DC bus voltage $+V_{dc}$. At the same time, voltage source $V_n$ is connected between AC phase voltage $V_{phs}$ and middle bus voltage $V_{mid}$ which may be at a negative potential with respect to positive DC bus voltage $+V_{dc}$.

During negative state 558, voltage source $V_p$ is connected between AC phase voltage $V_{phs}$ and middle bus voltage $V_{mid}$ whereas voltage source $V_n$ is connected between AC phase 326 and the negative DC bus. During zero state 556, voltage source $V_p$ and $V_n$ both are connected between AC phase voltage $V_{phs}$ and middle bus voltage $V_{mid}$. As can be seen from FIG. 5, for transitioning from one state to another state one or more thyristors may need to be switched off or commutated. For example, during the positive state 554, thyristors $T_1$ and $T_3$ are conducting and to begin the transition to the negative state 558, first thyristor $T_1$ need to be switched off then thyristor $T_2$ need to be switched on and then again thyristor $T_3$ need to be switched off.

In one embodiment, to force commutate a thyristor, a thyristor current is forced to zero and an anode voltage of the thyristor with respect to its cathode is held negative for a designated turn-off time $t_q$. Furthermore, a rate of rise of the anode voltage after being kept at the negative voltage for time $t_q$ is limited to a designated voltage ramp level. In one embodiment, the designated hold-off time and the designated ramp level both are determined based on thyristor characteristics and overall system parameters.

In one embodiment of the present technique, voltages across switching units 334 in chain links 320 and 322 of FIG. 2 are regulated to control the thyristor commutation (also referred to as the switch or the thyristor turn off process). It should be noted that even though present discussion provides thyristor commutation examples in the context of the MEMC converter, the technique for thyristor commutation disclosed herein can be applied to any other power conversion device utilizing a thyristor in combination with a chain link having switching units.

Figure 6:
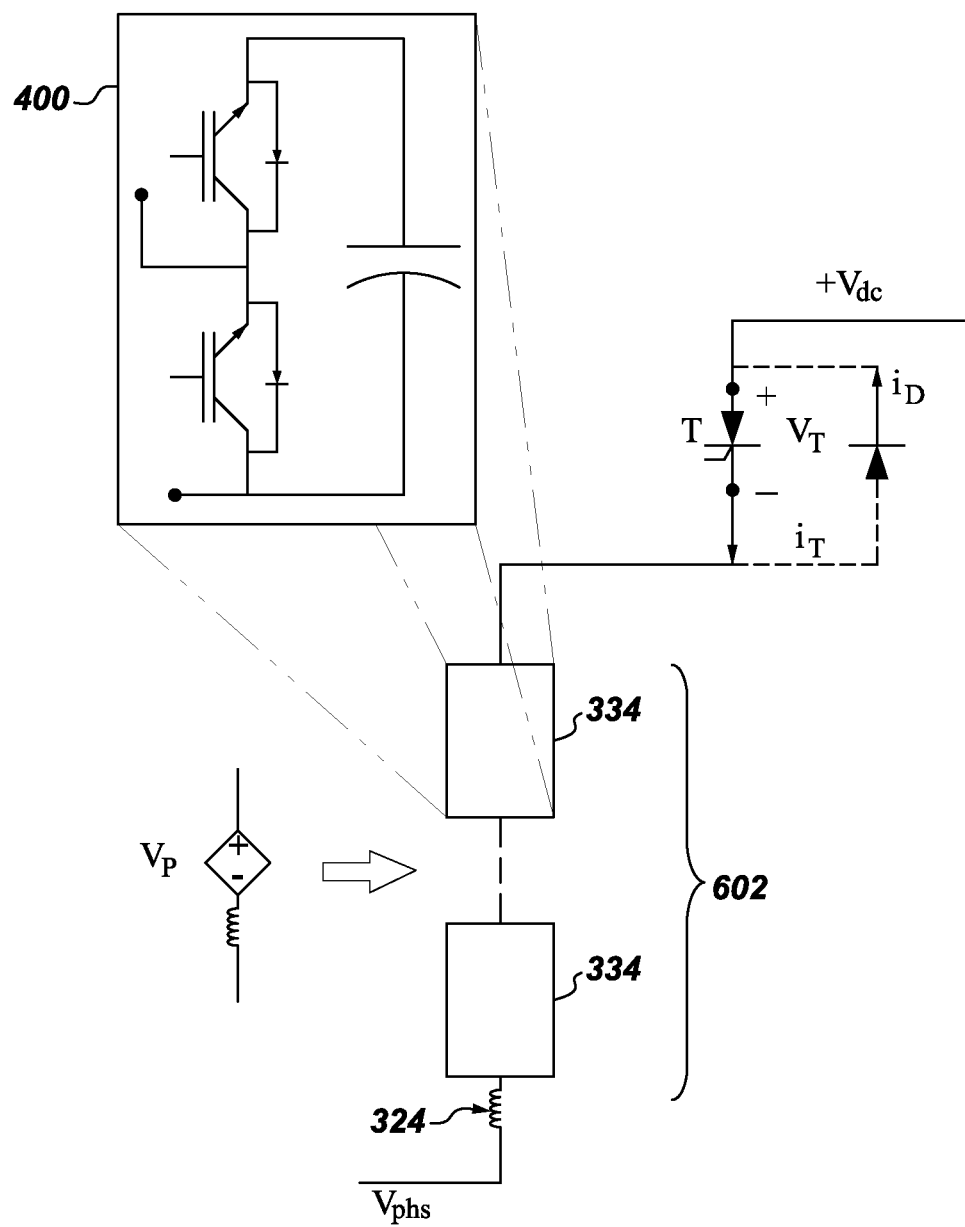
FIG. 6 is a diagrammatical representation of a section of the modular embedded multilevel converter (MEMC) of FIG. 2, according to aspects of the present disclosure.

Referring now to FIG. 6, diagrammatical representation of a section 600 of modular embedded multilevel converter (MEMC) 300 of FIG. 2 is depicted. For ease of understanding, FIG. 6 will be described with respect to FIGS. 1 and 2. In the section shown, thyristor 333, diode 332, inductor 324 and a chain link 602 of switching units 334 are depicted. An example of switching unit 334, which is a half bridge converter configuration 400 as in FIG. 3 is also depicted and positive DC bus voltage $+V_{dc}$ as well as AC phase voltage $V_{phs}$ is also shown. As described earlier, the switching unit 334 could also be a full bridge converter configuration 500 as in FIG. 4. Furthermore, chain link 602 may also include a combination of half bridge converter configurations and full bridge converter configurations. For ease of explanation, a positive polarity of voltage across thyristor 333 is shown as +/−sign and a positive direction of current through thyristor 333 is shown as a downward arrow in FIG. 6. Furthermore, an equivalent voltage source $V_p$ for chain link 602 is also shown. As discussed earlier, voltage of voltage source $V_p$ depends on control of switching units 334. When thyristor 333 is switched ON, a voltage $V_T$ across the thyristor is positive and close to zero and a current $i_T$ through the thyristor is positive. It should also be noted that, for other thyristors in MEMC 300 which are not shown in section 600, each thyristor will be in series with at least one chain-link when it is conducting. The chain link may be from the same phase leg or from a different phase leg. Furthermore, thyristors which are not conducting at the same time may share a common chain-link.

In an embodiment, controller 108 is utilized to control the overall operation of MEMC 300 including the thyristor commutation. In one embodiment, to switch off thyristor 333, controller 108 first removes a gate signal of thyristor 333. However, it should be noted that thyristor 333 would not switch off merely by removing its gate signal but the thyristor current $i_T$ also needs to be reduced to zero. Furthermore, thyristor current $i_T$ would go to zero only when the thyristor voltage $V_T$ is negative i.e., when the voltage ($V_{phs}$+ $V_p$) is higher than voltage $+V_{dc}$, where voltage $V_{phs}$ is defined by voltage $V_n$ (FIG. 5). Since switching units 334 have energy storage components (e.g., element 406 of FIG. 2), current $i_T$ can be regulated to zero without the help of any external power source, such as an AC grid which is generally needed in conventional thyristor commutation. Thus, controller 108 controls switching units 334 in chain link 602 so as to make voltage $V_p$ higher than voltage $+V_{dc}$. In addition, when current $i_T$ is decreasing, controller 108 controls a current decrease ramp rate $di_T/dt$ of thyristor current $i_T$ as per thyristor characteristics requirements. For example, in one embodiment, the thyristor characteristics may require that decrease slope $di_T/dt$ of thyristor current $i_T$ should be less than or equal to 10 A/µs. Accordingly, controller 107 regulates voltage $V_p$ and controls the decrease slope.

It should be noted that although it is stated here that thyristor current $i_T$ is regulated to zero with the help of chain-link 602, more than one chain link in the MEMC converter may be utilized together to regulate the thyristor current $i_T$ to zero. For example, voltage sources $V_p$ and $V_n$ both are used in sync to commutate a thyristor.

As discussed above to switch off thyristor 333, the thyristor current $i_T$ should reduce to zero. Controller 108 can determine a time point when thyristor current $i_T$ reaches zero by different methods. In an embodiment where there is an anti-parallel diode 332 with thyristor 333 to carry the negative current as shown in FIG. 6, controller 108 determines such time point based on measurement of the negative current in the anti-parallel diode 332. However, if there no path for negative current then another way controller 108 detects the time point for zero thyristor current is based on measurement of the voltage across the thyristor.

If after the thyristor 333 is switched off, thyristor voltage $V_T$ is going to be negative then the whole process to switch off thyristor may be over. However, if thyristor 333 needs to block a positive voltage after it is switched off then the controller 108 keeps applying the negative thyristor voltage $V_T$ for a time period $t_q$. Time period $t_q$ may also be referred to as a switch off time i.e., a time period which needs to lapse after thyristor current $i_T$ reaches zero and before thyristor voltage $V_T$ can be made positive. Time period $t_q$ can be affected by many factors and is chosen based on thyristor characteristics and overall system parameters. Furthermore, after time period $t_q$, controller 108 regulates a rate of reapplication of the positive voltage on the thyristor, dv/dt to a designated ramp level which again is determined based on thyristor characteristics and overall system parameters.

Figure 7:
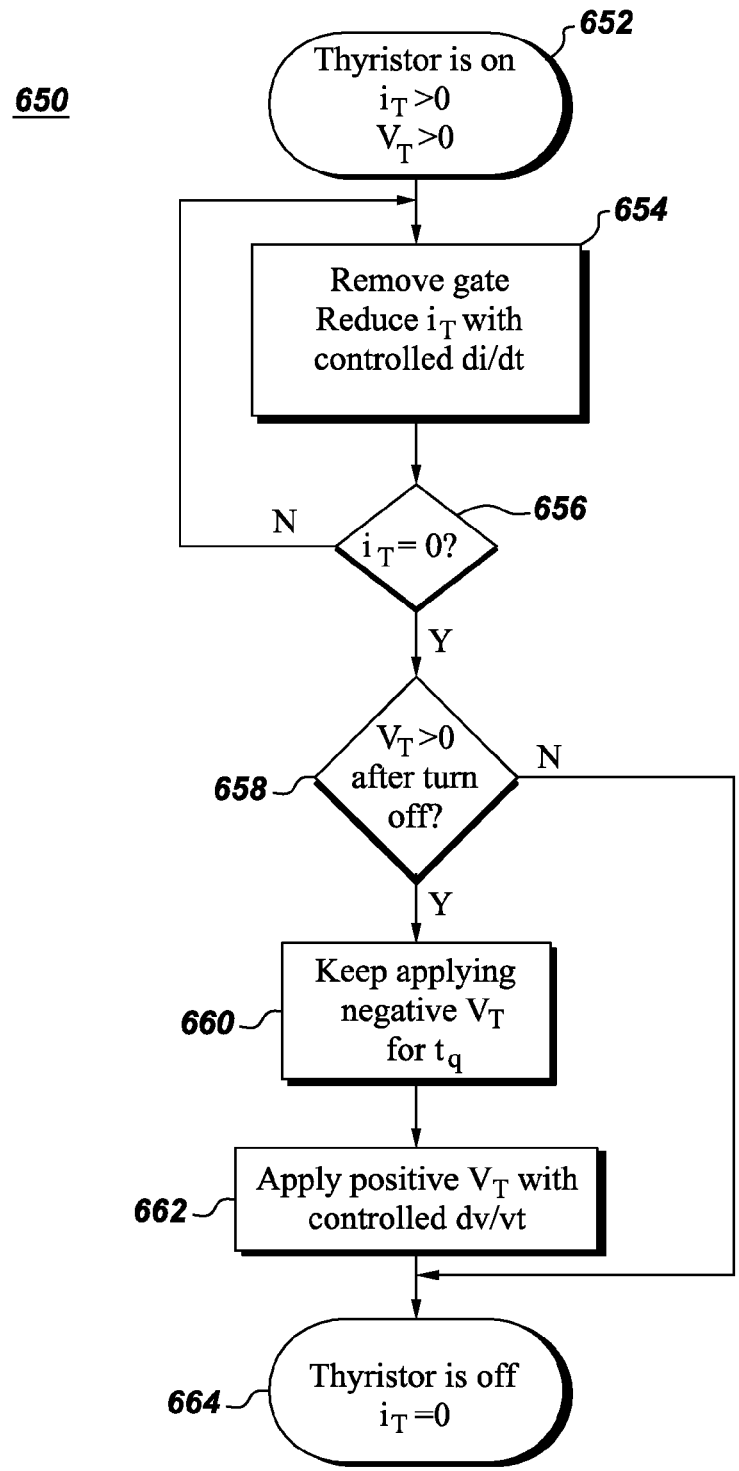
FIG. 7 is a flow chart representation of a method for commutating a thyristor in a converter having a chain link including switching units, according to aspects of the present disclosure.

Referring to FIG. 7, a flow chart representation 650 of a method for commutating a thyristor in a converter having a chain link including switching units is depicted. For ease of understanding, FIG. 7 will be described with respect to FIGS. 1 and 6. The method starts with step 652 where the thyristor is in ON state i.e., thyristor current $i_T$ and thyristor voltage $V_T$ are greater than zero. At step 652, a gate signal to the thyristor is removed and then thyristor current $i_T$ is slowly reduced with a controlled $di_T/dt$ slope. As mentioned above, to reduce thyristor current $i_T$, controller 108 applies a negative voltage across the thyristor. In other words, controller 108 controls switching units 334 in chain link 602 so as to make voltage $V_p$ higher than voltage $+V_{dc}$. At step 656, it is determined whether thyristor current $i_T$ has indeed reduced to zero. If thyristor current $i_T$ is not reduced to zero then step 656 may be repeated after some time or the method may move back to step 654 to remove gate signal to the thyristor. However, if thyristor current $i_T$ is indeed zero then the method moves to step 658. At step 658, it is determined whether thyristor voltage $V_T$ will be greater than zero. If thyristor voltage $V_T$ will be greater than zero then the method moves to step 660 else the method moves to step 664 which discloses that the thyristor is in OFF state. At step 660, controller 108 keeps applying the negative voltage across the thyristor for a time period $t_q$ which is a switch off time. After time period $t_q$, if needed at step 662 a positive voltage is applied across the thyristor with a controlled dv/dt rate and then step 664 discloses that the thyristor is in OFF state.

Figure 8:
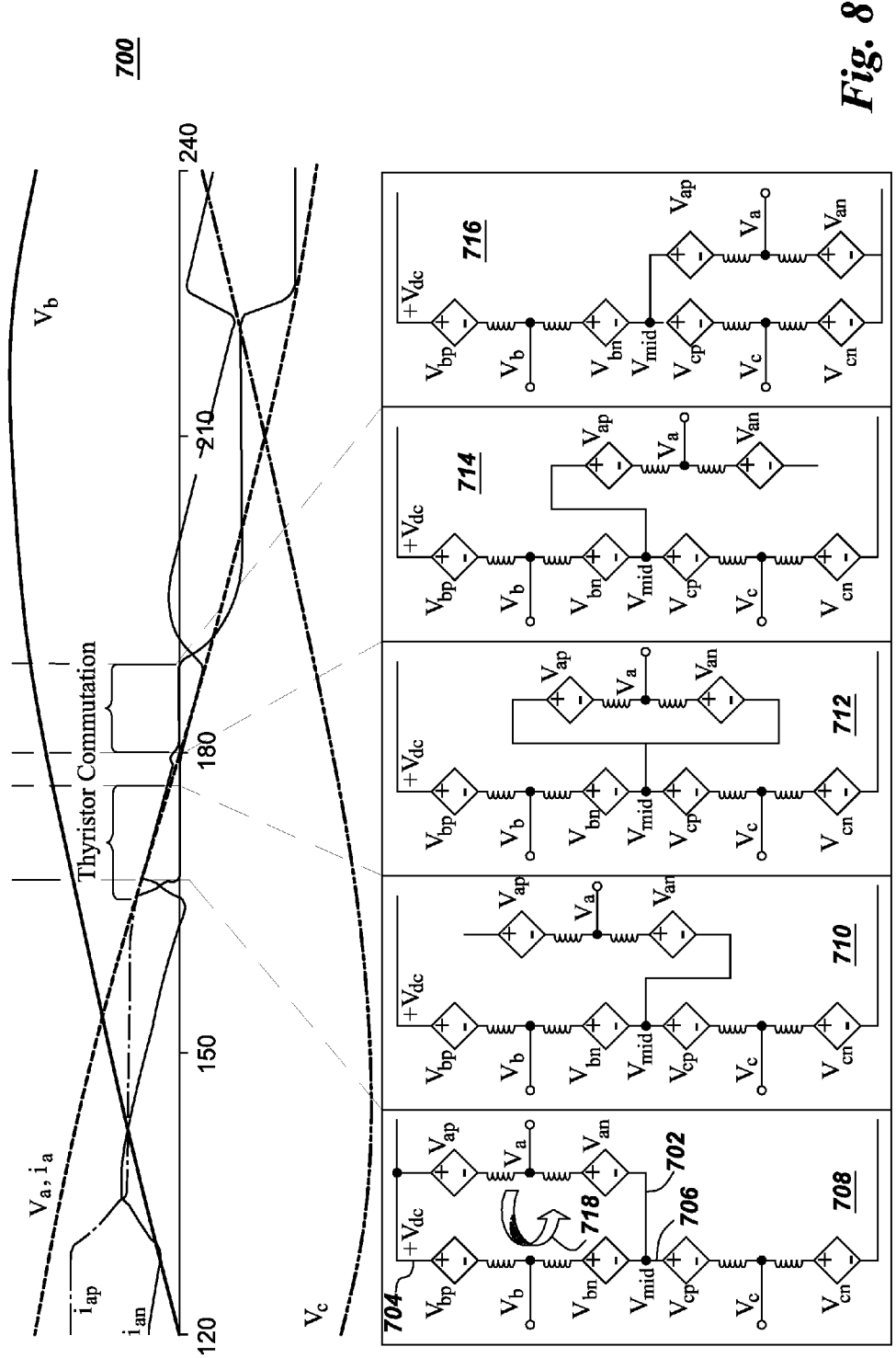
FIG. 8 is a diagrammatical representation of progression of one phase leg from a positive state to a negative state, according to aspects of the present disclosure.

Referring to FIG. 8, a diagrammatical representation 700 of progression of one phase leg 702 (i.e., phase a) from a positive state to a negative state is depicted. For ease of understanding, FIG. 8 will be described with respect to FIGS. 2, 5 and 6. FIG. 8 shows voltage waveforms $V_a$, $V_b$ and $V_c$ corresponding to three AC phases a, b and c respectively. Chain link currents $i_{ap}$ and $i_{an}$ corresponding to first and second chain links of the phase leg a are also depicted. Furthermore, first and second chain link voltage sources related to three phase legs 702, 704, 706 (corresponding to phases a, b and c) are represented by voltage sources $V_{ap}$, $V_{an}$, $V_{bp}$, $V_{bn}$, $V_{cp}$ and $V_{cn}$ respectively.

Phase leg 702 transitions from a positive state to a negative state via a zero state. In the zero state, voltage sources $V_p$ and $V_n$ both are connected between AC phase voltage $V_a$ and middle bus voltage $V_{mid}$. If the voltage sources $V_p$ and $V_n$ include only unidirectional voltage modules (e.g., half bridge converter 400 of FIG. 3 which is capable of producing only positive and zero level voltages), then during zero state the AC phase voltage $V_a$ is at the same voltage as the middle bus voltage $V_{mid}$. However, to transition from zero state to negative state and so to commutate thyristor $T_3$, at least one of the voltage sources $V_p$ or $V_n$ should be capable of developing some negative voltage. Therefore, voltage sources $V_p$ and $V_n$ may include at least some bidirectional voltage modules (e.g., full bridge converter 500 of FIG. 4 which is capable of producing positive as well as negative level voltages along with zero level voltage). It should also be noted that the extent of the bidirectional voltage capability of the chain link plays a major role in the time it takes for the phase leg to transition from one state to another.

It can be seen from FIG. 8 that when phase leg 702 is transitioning from the positive state to the negative state, phase leg 704 is in the positive state and phase leg 706 is in the negative state. In order to support the full DC bus voltage (i.e., $+V_{dc}$ to $-V_{dc}$) it is desired that at least one phase leg be in the positive state and one phase leg be in the negative state simultaneously. Thus, in the present embodiment, phase leg 704 is effectively connected in series with the phase leg 706 across the entire DC bus formed by the positive DC bus and the negative DC bus. In FIG. 8, the transition of phase leg 702 from the positive state to the negative state via the zero state is shown in five stages. In the first stage 708, phase leg 702 is in the positive state; in the third stage 712, phase leg 702 is in the zero state and in the fifth stage 716, phase leg 702 is in the negative state. Furthermore, second stage 710 is a middle stage between the positive and the zero state where thyristor $T_1$ (FIG. 5) commutates and fourth stage 714 is another middle stage between the zero and the negative state where thyristor $T_3$ commutates.

As discussed earlier, the first step in the transition of phase leg 702 from the positive state to the negative state is to turn off thyristor $T_1$. In other words, controller 108 removes the gate signal to thyristor $T_1$ if it present. In the next step, Controller 108 drives the current in thyristor $T_1$ to zero at a controlled maximum rate of change. This is equivalent to driving the current in the upper chain link $i_p$ to zero or below at some designated current decrease ramp rate di/dt. In order to support the required phase leg current when current $i_p$ is reducing to zero, the lower chain link current in also changes in the opposite direction at the same di/dt. For this purpose, controller 108 generates and controls a circulating current 718 among voltage sources $V_{ap}$, $V_{an}$, $V_{bp}$ and $V_{bn}$ as shown in FIG. 8.

After the upper chain link current $i_p$ and thus thyristor $T_1$ current crosses through zero, controller 108 holds the thyristor voltage $V_T$ at zero or slightly negative volts for the required turn-off time $t_q$. In other words, controller 108 controls the upper chain link voltage to be equal to or slightly greater than the difference between the phase voltage Va and DC link voltage Vdc. During this stage, the anti-parallel diode of $T_1$ would conduct and carry the negative current the upper chain link. After the turn-off time $t_q$, controller 108 increases the upper chain link voltage to the middle bus voltage under a controlled dv/dt rate. Once the thyristor voltage $V_T$ is brought down to the middle bus voltage $V_{mid}$, controller 108 provides a gate pulse to thyristor $T_2$ to switch it on for connecting the upper chain link to the middle bus. This completes the transition of phase leg 702 from the positive state to the zero state. The controller 108 then utilizes similar steps for thyristor $T_3$ to transition from the zero state to the negative state.

The various embodiments of the power converter and the methods of power conversion described hereinabove aid in developing multilevel power converters, thereby allowing generation of high power/voltage/current output. Furthermore, the use of thyristors in the power converter provides a less expensive and efficient system compared to a conventional modular power converter. One of the features of the present technique is that it does not need any external power source such as an AC power grid for the thyristor commutation process and thus enhances control flexibility of the converter.

While only certain features of the invention have been illustrated and described herein, many modifications and changes will occur to those skilled in the art. It is, therefore, to be understood that the appended claims are intended to cover all such modifications and changes as fall within the true spirit of the application.

The invention claimed is:

1. A method for power conversion, comprising:
coupling a first string to a second string via a first connecting node and a second connecting node to form at least one leg of a power converter, wherein the first string is operatively coupled across a first bus and a second bus and comprises a first branch and a second branch coupled via a third connecting node, the third connecting node being operatively coupled to a third bus comprising a floating bus, a grounded bus, or a high impedance grounded bus, wherein the first branch and the second branch include a plurality of controllable semiconductor switches and wherein the second string comprises a first chain link and a second chain link coupled via an alternating current phase bus-and including a plurality of switching units; and
controlling the first chain link and/or the second chain link to generate a negative voltage across at least one of the plurality of controllable semiconductor switches during a switch turn off process.

2. The method of claim 1, wherein the plurality of controllable semiconductor switches include a plurality of thyristors.

3. The method of claim 2, further comprising removing a gate signal of at least one thyristor during the switch turn off process.

4. The method of claim 3, further comprising reducing a thyristor current of the at least one thyristor with a current decrease ramp rate.

5. The method of claim 4, further comprising applying a negative voltage across the at least one thyristor for a turn off time period after the thyristor current is detected to have reached zero.

6. The method of claim 5, wherein a time point when the thyristor current is reduced to zero is determined based on a measurement of a negative current in an anti-parallel diode across the thyristor or a measurement of the voltage across the thyristor.

7. The method of claim 6, further comprising applying a positive voltage across the at least one thyristor with a voltage ramp rate.

8. The method of claim 7, wherein the current decrease ramp rate, the turn off time period and the voltage ramp rate are determined based on thyristor characteristics and overall system parameters.

9. The method of claim 8, wherein controlling the first chain link and the second chain link comprises controlling a voltage across the plurality of switching units.

10. The method of claim 9, wherein controlling the voltage across the plurality of switching units comprises generating a zero or a positive voltage from a plurality of half bridge converters or generating a zero, positive or a negative voltage from a plurality of full bridge converters.

11. A power converter, comprising:
one or more phase legs, wherein each of the one or more phase legs comprises:
 a first string comprising a first branch and a second branch including a plurality of controllable semiconductor switches, a first connecting node and a second connecting node, wherein the first string is operatively coupled across a first bus and a second bus and the second branch is operatively coupled to the first branch via a third connecting node; and
 a second string operatively coupled to the first string via the first connecting node and the second connecting node, wherein the second string comprises a first chain link and a second chain link including a plurality of switching units, and wherein the second chain link-is operatively coupled to the first chain link via an alternating current phase bus; and
 a controller configured to control a switch turn-off process of at least one of the plurality of controllable semiconductor switches by regulating the first chain link and the second chain link; wherein the first chain link and/or the second chain link are utilized to generate a negative voltage across the at least one controllable semiconductor switch during the switch turn off process;
wherein the third connecting node is operatively coupled to a third bus comprising a floating bus, a grounded bus, or a high impedance grounded bus.

12. The power converter of claim 11, wherein the plurality of controllable semiconductor switches include a plurality of thyristors.

13. The power converter of claim 11, wherein the plurality of switching units comprises a plurality of fully controllable semiconductor switches and at least one energy storage device.

14. The power converter of claim 13, wherein the plurality of fully controllable semiconductor switches comprises an insulated gate bipolar transistor, a metal oxide semiconductor field effect transistor, a field effect transistor, a gate turn-off thyristor, an insulated gate commutated thyristor, an injection enhanced gate transistor, a silicon carbide based switch, a gallium nitride based switch, a gallium arsenide based switch, or combinations thereof.

15. The power converter of claim 11, wherein the first bus comprises a positive direct current bus and the second bus comprises a negative direct current bus.

16. The power converter of claim 11, wherein the controller operates each of the one or more legs in a positive state or a negative state or a zero state.

17. The power converter of claim 11, wherein during the switch turn off process the controller utilizes the first chain link and the second chain link of another phase leg.

18. The power converter of claim 17, wherein during the switch turn off process the controller reduces a current in the first chain link with a current decrease ramp rate and increases a current in the second chain link with the same current decrease ramp rate.

19. The power converter of claim 17, wherein during the switch turn off process the controller generates a circulating current between two phase legs.

* * * * *